(12) United States Patent
Osaka

(10) Patent No.: US 9,184,864 B2
(45) Date of Patent: Nov. 10, 2015

(54) OPTICAL TRANSMISSION SYSTEM, OPTICAL TRANSMITTING APPARATUS, AND OPTICAL RECEIVING APPARATUS

(75) Inventor: Takeo Osaka, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 235 days.

(21) Appl. No.: 13/463,387

(22) Filed: May 3, 2012

(65) Prior Publication Data

US 2013/0004162 A1 Jan. 3, 2013

(30) Foreign Application Priority Data

Jun. 28, 2011 (JP) ................................. 2011-143019

(51) Int. Cl.
*H04B 10/00* (2013.01)
*H04B 10/08* (2006.01)
*H04B 17/00* (2015.01)
*H04J 14/02* (2006.01)
*H04B 10/2507* (2013.01)

(52) U.S. Cl.
CPC ............ *H04J 14/02* (2013.01); *H04B 10/2572* (2013.01)

(58) Field of Classification Search
CPC ............. H04B 10/2569; H04B 10/572; H04B 14/0287; H04B 14/0201; H04B 14/02
USPC ................. 398/25, 33, 34, 140, 162
See application file for complete search history.

(56) References Cited

U.S. PATENT DOCUMENTS

| | | | |
|---|---|---|---|
| 5,841,557 A | 11/1998 | Otsuka et al. | |
| 5,841,571 A * | 11/1998 | Terahara | 359/341.41 |
| 7,116,419 B1 * | 10/2006 | Weiner et al. | 356/364 |
| 8,543,000 B2 * | 9/2013 | Vassilieva et al. | 398/81 |
| 2003/0081306 A1 * | 5/2003 | Lee et al. | 359/326 |
| 2003/0223689 A1 * | 12/2003 | Koch et al. | 385/37 |
| 2004/0208619 A1 * | 10/2004 | Li et al. | 398/159 |
| 2006/0250682 A1 * | 11/2006 | Tian et al. | 359/337.5 |
| 2007/0110451 A1 * | 5/2007 | Rasmussen et al. | 398/158 |
| 2008/0138070 A1 * | 6/2008 | Yan et al. | 398/65 |
| 2009/0087194 A1 | 4/2009 | Nakashima et al. | |

(Continued)

FOREIGN PATENT DOCUMENTS

| | | |
|---|---|---|
| JP | 9-149006 | 6/1997 |
| JP | 2000-059308 | 2/2000 |
| JP | 2000-196523 | 7/2000 |
| JP | 2009-089194 | 4/2009 |

OTHER PUBLICATIONS

Japanese Office Action dated Apr. 21, 2015 in corresponding Japanese Patent Application No. 2011-143019, 4 pages.

*Primary Examiner* — David Payne
*Assistant Examiner* — Pranesh Barua
(74) *Attorney, Agent, or Firm* — Staas & Halsey LLP

(57) ABSTRACT

An optical transmission system includes an optical transmitting apparatus that includes a polarization controller configured to change a polarization state of a signal light at an operating frequency included in a frequency range at which polarization trackability is obtained on a receiving side, based on a notified monitoring result, the optical transmitting apparatus being configured to output the signal light having the changed polarization state, and an optical receiving apparatus that is provided on the receiving side and includes a monitoring control unit configured to receive the signal light having the changed polarization state and monitor transmission quality of the received signal light, the optical receiving apparatus being configured to notify the optical transmitting apparatus of the monitoring result.

18 Claims, 17 Drawing Sheets

(56) References Cited

U.S. PATENT DOCUMENTS

| | | | |
|---|---|---|---|
| 2009/0214212 A1* | 8/2009 | Vorbeck et al. | 398/79 |
| 2010/0315640 A1* | 12/2010 | Webb et al. | 356/364 |
| 2011/0135301 A1* | 6/2011 | Myslinski et al. | 398/34 |
| 2012/0121254 A1* | 5/2012 | Ellison et al. | 398/29 |

* cited by examiner

OPTICAL TRANSMISSION SYSTEM, OPTICAL TRANSMITTING APPARATUS, AND OPTICAL RECEIVING APPARATUS

CROSS-REFERENCE TO RELATED APPLICATION(S)

This application is based upon and claims the benefit of priority of the prior Japanese Patent Application No. 2011-143019, filed on Jun. 28, 2011, the entire contents of which are incorporated herein by reference.

FIELD

The embodiment discussed herein is related to an optical transmission system for performing optical transmission, an optical transmitting apparatus for transmitting optical signal light, and an optical receiving apparatus for receiving optical signal light.

BACKGROUND

Parameters of light include wavelength, intensity, as well as polarization, which represent the direction of an electric field of light and the change of the electric field over time. In optical communication networks, when signal light propagates in an optical fiber transmission line, the state of polarization changes under the effect of environmental conditions, such as temperature, and under conditions such as external stress. It is a known fact that optical fiber transmission lines and optical amplifiers have polarization dependence, which causes the transmission characteristics of optical fiber transmission lines to deteriorate.

Polarization dependence is primarily caused by polarization dependence gain (PDG) and polarization dependence loss (PDL), and cause characteristics, such as the optical signal to noise ratio (OSNR) or Q-factor, to deteriorate.

As a technique for reducing the above effects of polarization dependence gain and polarization dependence loss, there is a proposed polarization scrambler that aggressively changes the polarization state of signal light and brings the signal light into a non-polarized state (a state in which electric fields are uniformly distributed in all directions) on the transmitting side.

The polarization scrambler performs polarization scrambling on signal light and transmits signal light that has a randomly polarized state. As a result, the degradation in transmission quality caused by polarization dependence gain and polarization dependence loss is reduced.

An optical transmission technique using a polarization scrambler has been proposed (see, for example, Japanese Laid-open Patent Publication Nos. 2000-196523 and 09-149006).

A polarization scrambler in the related art generally has a scrambling frequency (a frequency at which polarization rotation is performed) ranging from several hundreds of kHz to 1 MHz. At the scrambling frequency, a polarization state becomes random.

As a technique for realizing high-capacity long-distance transmission, a coherent receiver technology has recently received attention. The development of an optical transmission system that uses the coherent receiver technology is proceeding.

For example, with an optical transmission system in the related art that has a transmission speed less than or equal to 10 Gbps, the polarization dependence gain and polarization dependence loss are large. However, it is difficult to update the optical transmission system in the related art with the coherent receiver technology, because a polarization scrambler in the related art may not be usable.

The reason for this is that the scrambling frequency (ranging from several hundreds of kHz to 1 MHz) of a polarization scrambler in the related art exceeds a frequency (several tens of kHz) at which polarization trackability is obtained for coherent reception. If a polarization scrambler becomes unusable, the effects of polarization dependence, that is, polarization dependence gain and polarization dependence loss, occurs and degradation of transmission quality worsens.

Accordingly, there is an increasing demand for a technique to efficiently suppress degradation in transmission quality caused by polarization dependence, in other words polarization dependence gain and polarization dependence loss, even if an optical receiving apparatus that has limited polarization trackability, such as in coherent reception, is used in an optical transmission system in the related art.

SUMMARY

According to an aspect of the invention, an optical transmission system includes an optical transmitting apparatus that includes a polarization controller configured to change a polarization state of a signal light at an operating frequency included in a frequency range at which polarization trackability is obtained on a receiving side, based on a notified monitoring result, the optical transmitting apparatus being configured to output the signal light having the changed polarization state, and an optical receiving apparatus that is provided on the receiving side and includes a monitoring control unit configured to receive the signal light having the changed polarization state and monitor transmission quality of the received signal light, the optical receiving apparatus being configured to notify the optical transmitting apparatus of the monitoring result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The embodiment discussed herein aims to provide an optical transmission system capable of suppressing degradation in transmission quality caused by polarization dependence even if an optical receiving apparatus having limited polarization trackability is used.

Figure 1:
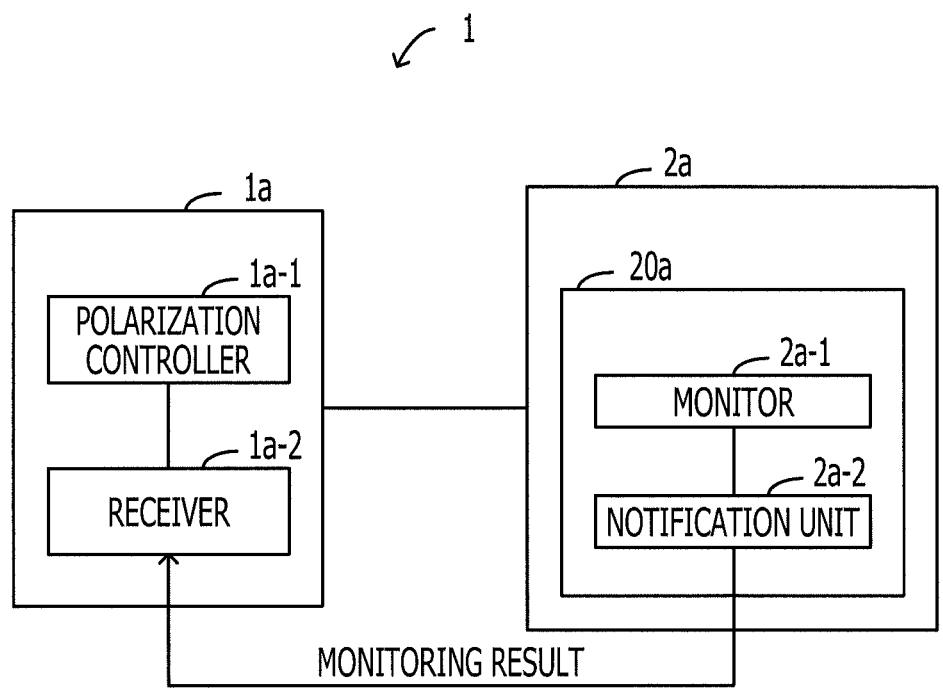
FIG. 1 is a diagram illustrating an example configuration of an optical transmission system.

An embodiment will be described below with reference to the accompanying drawings. FIG. 1 is a diagram illustrating an example configuration of an optical transmission system. An optical transmission system 1 includes an optical transmitting apparatus 1a and an optical receiving apparatus 2a.

The optical transmitting apparatus 1a includes a polarization controller 1a-1 and a receiver 1a-2. The polarization controller 1a-1 variably controls an operating frequency within the frequency range of the polarization trackability of the optical receiving apparatus 2a and changes the polarization state of a signal light so as to allow a notified monitoring result to be an approximately optimum value. For example, this function of the polarization controller 1a-1 is executed by a processor, like DSP (Digital Signal Processor), CPU (Central Processing Unit) and FPGA (Field-Programmable Gate Array).

The receiver 1a-2 receives a monitoring result of the transmission quality of the signal light.

The optical receiving apparatus 2a includes a monitoring control section 20a. The monitoring control section 20a includes a monitor 2a-1 and a notification unit 2a-2. The monitor 2a-1 monitors the transmission quality of received signal light. The notification unit 2a-2 notifies the optical transmitting apparatus 1a of a monitoring result. For example, this function of the monitoring control section 20a is executed by a processor, like DSP, CPU and FPGA.

Thus, in the optical transmission system 1, an operating frequency is variably controlled within the frequency range of polarization trackability based on a received monitoring result of transmission quality of signal light, a polarization state is changed, and signal light having an approximately optimum polarization state is transmitted.

Even if polarization control is performed for the optical receiving apparatus 2a, which has a limited polarization trackability, because polarization control is performed at an operating frequency set within the frequency range of the limited polarization trackability, degradation in transmission quality caused by polarization dependence may be suppressed.

Next, polarization dependence gain and polarization dependence loss will be described. Polarization dependence gain is a phenomenon in which a noise component in a polarized wave orthogonal to signal light is increased, and is caused by polarization hole burning (PHB).

Polarization hole burning is a phenomenon in which, if signal light is input into, for example, an erbium doped fiber amplifier (EDFA), an amplification factor in the direction of the signal light and an amplification factor in a direction orthogonal to the direction of the signal light slightly differ from each other. Due to the polarization hole burning phenomenon, more specifically, amplified spontaneous emission (ASE) light orthogonal to signal light is significantly amplified.

Polarization dependence loss is a phenomenon in which the insertion loss of an optical component changes in accordance with the polarization state of transmitted signal light. The optical component is, for example, an optical isolator formed by either an optical repeater or an optical coupler.

Polarization dependence gain increases the noise component in a polarized wave orthogonal to signal light. Polarization dependence loss changes the power of the signal light, so that the intensity of the signal light is modulated. Consequently, the OSNR degrades and fluctuation increases.

With a polarization scrambler, the degradation in transmission quality caused by polarization dependence gain and polarization dependence loss may be reduced. That is, by performing polarization scrambling on signal light and transmitting the signal light, the occurrence of polarization hole burning may be suppressed and intensity modulation resulting from polarization dependence loss may be averaged out.

Next, problems that arise if a general polarization scrambler is used with a receiver that has a limited polarization trackability will be described. A receiver that has a limited polarization trackability is, for example, a receiver that performs coherent reception.

Coherent reception is a reception technique for mixing a received optical signal and local oscillation light in a receiver, extracting the electric field information (optical phase and optical intensity) of the received optical signal, converting the electric field information into an electrical signal, and demodulating the electrical signal.

Digital coherent reception is widely performed. With digital coherent reception, an electrical signal obtained from extracted electric field information is quantized and is converted into a digital signal by an analogue-digital (A/D) converter, and the digital signal is demodulated by digital signal processing.

Since the digital coherent reception method provides better resistance to chromatic dispersion and polarization mode dispersion than the direct detection reception method and the delay detection reception method, transmission capacity may be increased and transmission quality may be improved.

However, with digital coherent reception, a very heavy processing load is put on computation processing for signal polarization identification control, such as polarization demultiplexing. Accordingly, polarization trackability obtained with the digital coherent reception method is several tens of kHz.

Since the frequency of the polarization trackability obtained with the digital coherent reception method is lower than the scrambling frequency (ranging from several hundreds of kHz to 1 MHz) of a polarization scrambler in the related art, it is difficult to track the polarization scrambler in the related art. For this reason, a polarization scrambler is not generally used for coherent reception.

Furthermore, there is another problem regarding the relationship between the polarization scrambling frequency and the receiving bandwidth of a receiver. If polarization scrambling is performed, polarization modulation is changed to intensity modulation under the effect of polarization dependence loss. An intensity-modulated component includes a harmonic component. Accordingly, either cross-phase modulation between the harmonic component and signal light or self-phase modulation occurs, and phase noise increases. When a scrambling frequency is increased, phase noise is included in the receiver's bandwidth, which causes the characteristics of the receiver to deteriorate.

The embodiment discussed herein provides an optical transmission system, which may suppress degradation in transmission quality caused by polarization dependence even if an optical receiving apparatus that has a limited polarization trackability is used, as well as an optical transmitting apparatus and an optical receiving apparatus that form the optical transmission system.

Next, the configuration of a system that performs wavelength division multiplexing (WDM) transmission and digital coherent reception, in which the optical transmission system 1 is used, will be described in detail.

Figure 2:
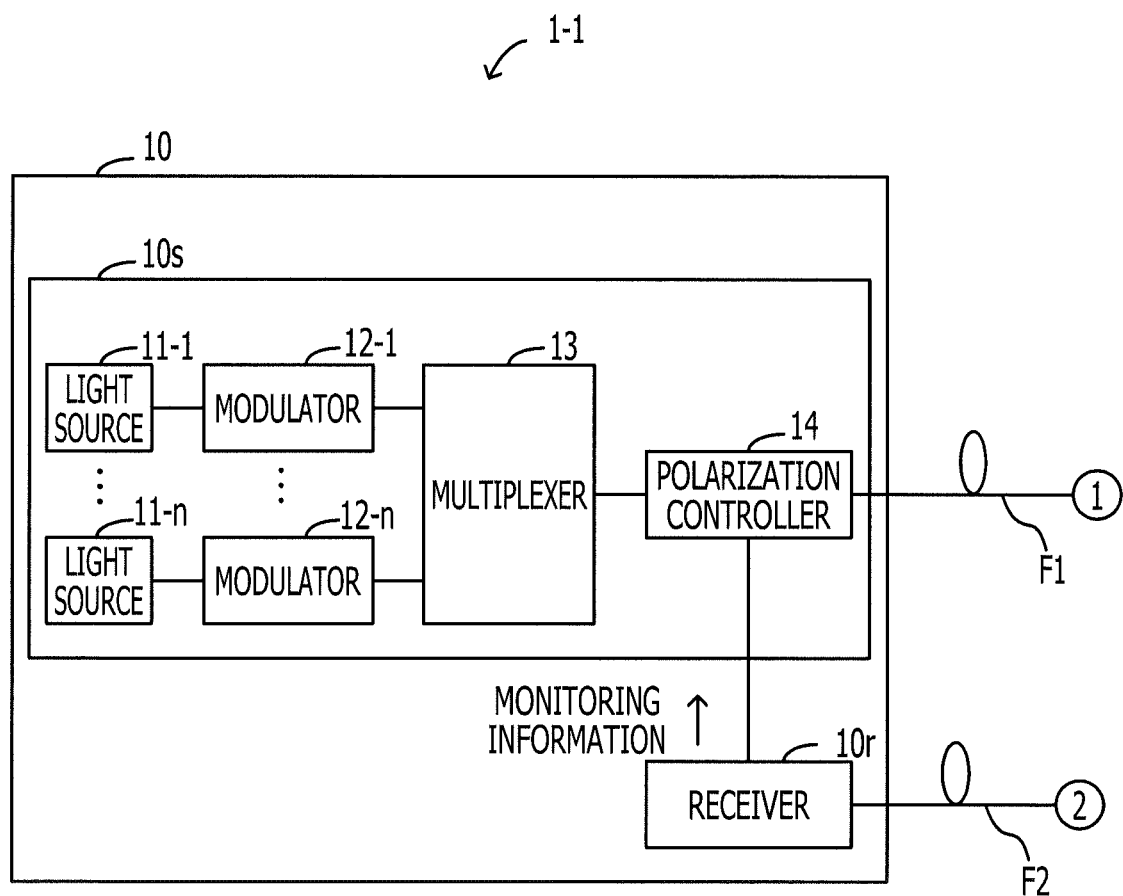
FIG. 2 is a diagram illustrating an example configuration of an optical transmission system.
Figure 3:
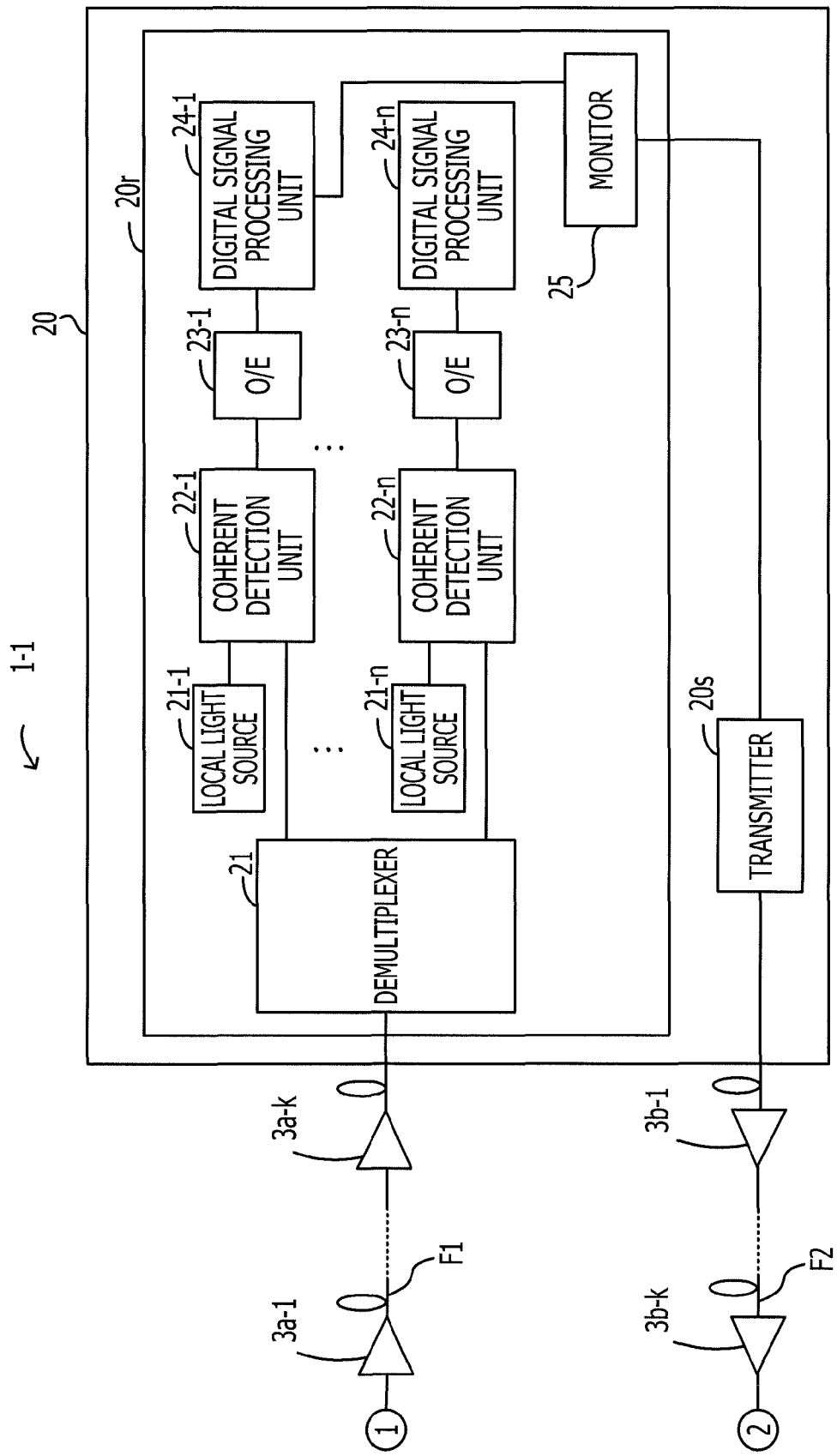
FIG. 3 is a diagram illustrating an example configuration of an optical transmission system.

FIGS. 2 and 3 are diagrams illustrating an example configuration of an optical transmission system. An optical transmission system 1-1 includes optical transmission apparatuses 10 and 20, and performs bi-directional WDM transmission. The optical transmission apparatuses 10 and 20 are connected to each other via optical fiber transmission lines F1 and F2. On the optical fiber transmission line F1, optical repeaters 3a-1 to 3a-k are disposed. On the optical fiber transmission line F2, optical repeaters 3b-1 to 3b-k are disposed.

The optical transmission apparatus 10 includes a transmitter 10s (corresponding to the optical transmitting apparatus 1a) and a receiving section 10r (corresponding to the receiver 1a-2). The optical transmission apparatus 20 includes a transmitter 20s and a receiving section 20r (corresponding to the optical receiving apparatus 2a). The transmitters 10s and 20s have the same transmitting function, and the receiving sections 10r and 20r have the same receiving function.

The transmitter 10s includes light sources 11-1 to 11-n, modulation units 12-1 to 12-n, a multiplexer 13, and a polarization controller 14 (corresponding to the polarization controller 1a-1). The light sources 11-1 to 11-n output light waves have different wavelengths $\lambda 1$ to $\lambda n$, respectively.

The modulation units 12-1 to 12-n perform certain modulation processing, based on an electric baseband signal, on the light waves, which are carrier waves, output from the light sources 11-1 to 11-n so as to superimpose information and generate signal lights having the wavelengths $\lambda 1$ to $\lambda n$.

The multiplexer 13 multiplexes the signal lights that have the wavelengths $\lambda 1$ to $\lambda n$, and generates wavelength division multiplexed signal light, in other words WDM signal light. The polarization controller 14 variably sets a scrambling frequency based on supplied monitoring information so as to allow a monitoring result to be an approximately optimum value on a receiving side. The polarization controller 14 changes the polarization state of the WDM signal light at the set scrambling frequency and transmits the WDM signal light, which has been subjected to polarization control, via the optical fiber transmission line F1.

The optical repeaters 3a-1 to 3a-k on the optical fiber transmission line F1 perform optical relay processing on the WDM signal light. The receiving section 20r includes a demultiplexer 21, local oscillation light sources (hereinafter referred to as local light sources) 21-1 to 21-n, coherent detection units 22-1 to 22-n, optical to electrical (O/E) converters 23-1 to 23-n, digital signal processing units 24-1 to 24-n, and a monitor 25. The monitor 25 includes the function of the monitor 2a-1 illustrated in FIG. 1, and the transmitter 20s includes the function of the notification unit 2a-2 illustrated in FIG. 1.

The demultiplexer 21 receives the relayed WDM signal light, demultiplexes the WDM signal light into n signal lights having different wavelengths, $\lambda 1$ to $\lambda n$, and outputs the signal lights. The local light sources 21-1 to 21-n output local oscillation light (local light).

The coherent detection unit 22-1 mixes the local light output from the local light source 21-1 and the signal light having the wavelength $\lambda 1$ and outputs the electric field information (that is, optical phase and optical intensity) of the signal light having the wavelength $\lambda 1$. The coherent detection unit 22-n mixes the local light output from the local light source 21-n and the signal light having the wavelength $\lambda n$ and outputs the electric field information of the signal light having the wavelength $\lambda n$.

The O/E converters 23-1 to 23-n convert electric field information transmitted from the coherent detection units 22-1 to 22-n into analog electrical signals. Each of the digital signal processing units 24-1 to 24-n converts a corresponding analog signal that includes electric field information into a digital signal, and controls the demodulation of received data by performing digital signal processing. The digital signal processing unit may be, for example, a digital signal processor (DSP).

The monitor 25 monitors the transmission quality of a signal identified by the digital signal processing unit 24-1. As a measure of transmission quality, for example, a bit error rate (BER) or a Q factor may be used.

The transmitter 20s is similar to the transmitter 10s, and performs optical transmission in a direction opposite to the direction of optical transmission performed by the transmitter 10s. Light output from the transmitter 20s is transmitted via the optical repeaters 3b-1 to 3b-k disposed on the optical fiber transmission line F2.

Monitoring information output from the monitor 25 is also transmitted to the optical transmission apparatus 10 via the optical fiber transmission line F2, which is a paired line. The monitoring information is included in the overhead of the signal light and is transmitted to an opposed side. The monitoring information may be transmitted by using an optical supervisory channel (OSC) signal.

In the example illustrated in FIG. 3, the monitor 25 monitors only the transmission quality of a signal processed by the digital signal processing unit 24-1. This point will be described. The value of a scrambling frequency mainly depends on the characteristics of polarization dependence gain (the characteristics of the response for polarization hole burning), the polarization trackability of the receiving section 20r, and the receiving bandwidth of the receiving section 20r (to be described later).

In general, the characteristics of polarization dependence gain, the polarization trackability of the receiving section 20r, and the receiving bandwidth of the receiving section 20r are not significantly affected by the wavelength dependence of the signal light. Accordingly, the optical transmission system 1-1 may monitor transmission quality with a single specific signal light.

Therefore, if transmission quality does not have wavelength dependence, control processing may be efficiently performed by monitoring the transmission quality of a single signal light and performing polarization control (polarization scrambling) on WDM signal light based on a result of the monitoring.

Figure 4:
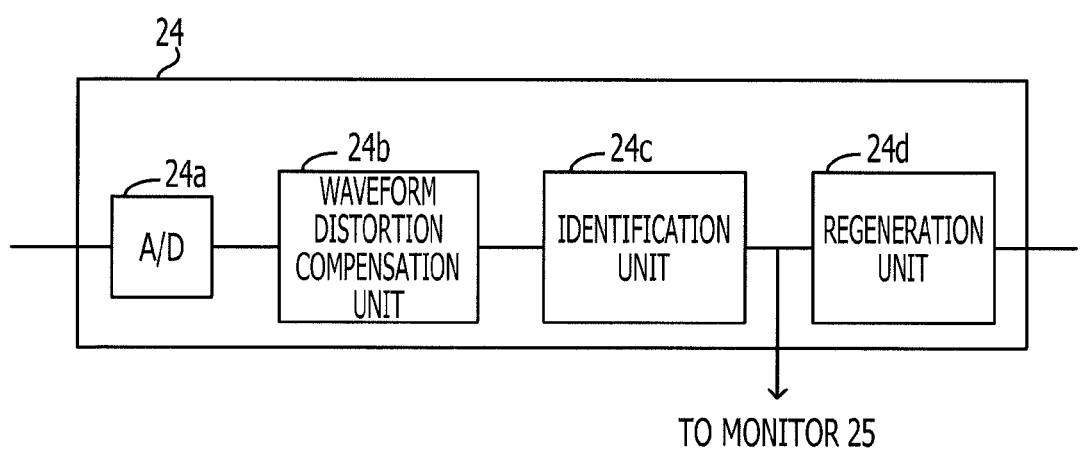
FIG. 4 is a diagram illustrating an example configuration of a digital signal processing unit.

FIG. 4 is a diagram illustrating an example configuration of a digital signal processing unit. The digital signal processing unit 24 includes an A/D converter 24a, a waveform distortion compensation unit 24b, an identification unit 24c, and a regeneration unit 24d.

The A/D converter 24a quantizes an analog signal, which is output from each of the O/E converters 23-1 to 23-n and includes electric field information superimposed thereon, and converts the analog signal into a digital signal.

The waveform distortion compensation unit 24b compensates for waveform distortion that has been caused by a non-linear effect in the optical fiber transmission line F1, such as chromatic dispersion or polarization mode dispersion, by performing digital signal processing. The identification unit 24c performs identification processing on a signal that has been subjected to waveform distortion compensation. The signal that has been subjected to the identification processing is transmitted to the monitor 25 and the regeneration unit 24d. The regeneration unit 24d performs regeneration processing on the signal, extracts baseband information and performs data demodulation.

Figure 5:
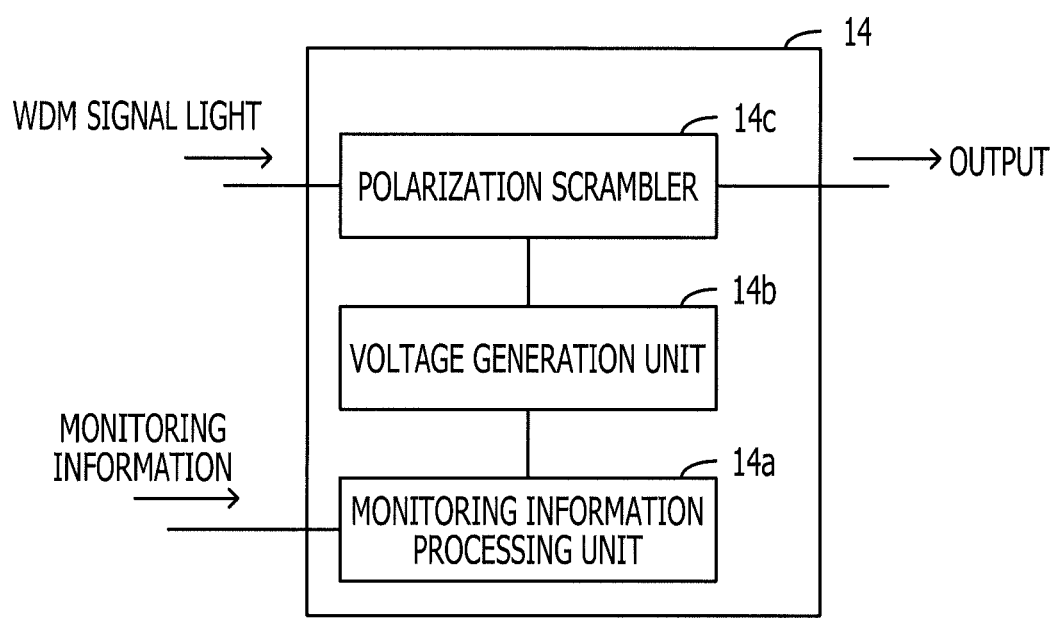
FIG. 5 is a diagram illustrating an example configuration of a polarization controller.

FIG. 5 is a diagram illustrating an example configuration of a polarization controller. The polarization controller 14 includes a monitoring information processing unit 14a, a voltage generation unit 14b, and a polarization scrambler 14c. The monitoring information processing unit 14a receives signal light transmitted from the optical transmission apparatus 20 via the optical fiber transmission line F2, extracts, from the overhead of the signal light, monitoring information about transmission quality (such as the BER or Q factor of the optical transmission apparatus 20) by performing firmware processing, and stores the extracted monitoring information. Furthermore, the monitoring information processing unit 14a performs confirmation processing to determine, for example, whether transmission quality has improved.

The voltage generation unit 14b generates a control voltage according to the monitoring information. The polarization scrambler 14c varies the scrambling frequency based on the control voltage applied from the voltage generation unit 14b, changes the polarization state of the WDM signal light based on the variably-set scrambling frequency, and outputs the WDM signal light.

Figure 6:
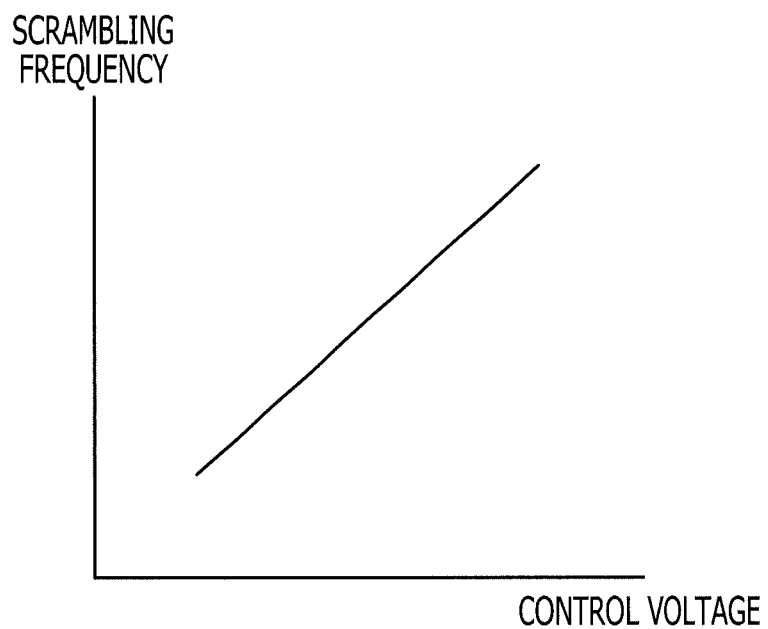
FIG. 6 is a diagram illustrating the relationship between a scrambling frequency and a control voltage.

FIG. 6 is a diagram illustrating the relationship between a scrambling frequency and a control voltage. The horizontal axis represents a control voltage, and the vertical axis represents a scrambling frequency. As illustrated in FIG. 6, the scrambling frequency may be variably changed in accordance with the value of the control voltage.

Figure 7:
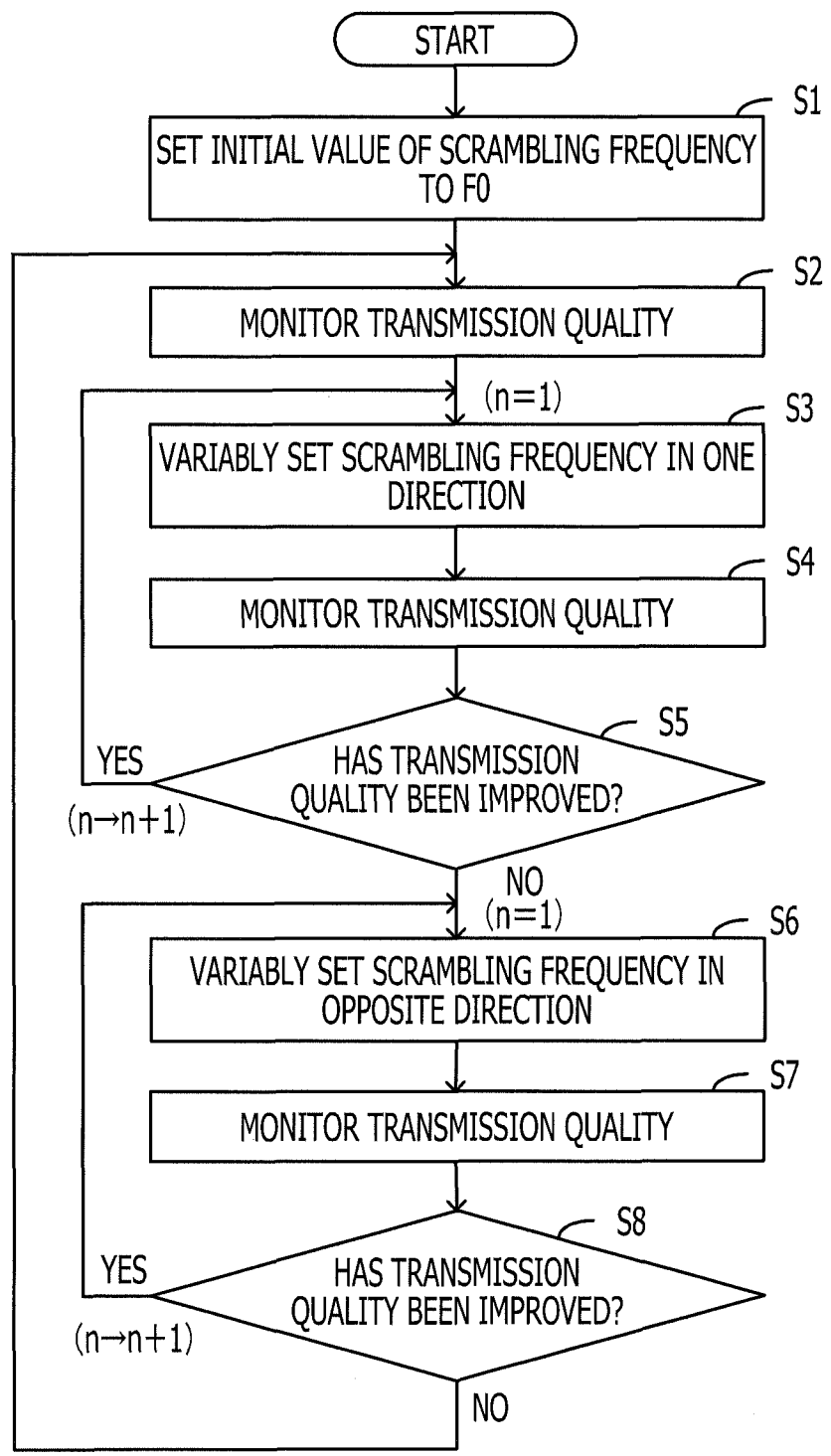
FIG. 7 is a flowchart illustrating a process of variably setting a scrambling frequency.

Next, a process of variably setting a scrambling frequency based on monitored transmission quality will be described with reference to a flowchart. FIG. 7 is a flowchart illustrating a process of variably setting a scrambling frequency.

The polarization controller 14 sets the initial value of a scrambling frequency, f0 (S1).

The monitor 25 monitors the transmission quality of a received signal (S2).

The polarization controller 14 variably sets the scrambling frequency in one direction based on the monitored transmission quality (S3). In this case, a value f1 of the scrambling frequency which is obtained by changing the initial value f0 n times in one direction is represented by $f1=f0+n\times\Delta f$ where n represents the number of times of variable setting and $\Delta f$ represents an amount of frequency change from the initial value f0. When the number of times of variable setting is performed is one, the value f1 is represented by $f1=f0+\Delta f$.

The monitor 25 monitors the transmission quality of a received signal (S4).

The polarization controller 14 determines whether transmission quality has improved (S5). If the polarization controller 14 determines that transmission quality has improved (yes in S5), the process proceeds to step S3. If the polarization controller 14 determines that transmission quality has not improved (no in S5), the process proceeds to step S6.

If transmission quality has improved, n is set to n+1, and the scrambling frequency is calculated with the equation in step S3 (the value of the scrambling frequency further moves in the same direction by $\Delta f$).

The polarization controller 14 variably sets the scrambling frequency based on the monitored transmission quality (S6). In this case, the polarization controller 14 variably sets the scrambling frequency by changing the frequency value in a direction opposite to the direction in step S3.

A value f2 of the scrambling frequency, which is obtained by changing the scrambling frequency from the initial value f0 in the opposite direction, is represented by $f2=f0-n\times\Delta f$.

The monitor 25 monitors the transmission quality of a received signal (S7).

The polarization controller 14 determines whether transmission quality has improved (S8). If the polarization controller 14 determines that transmission quality has improved (yes in S8), the process proceeds to step S6. If the polarization controller 14 determines that transmission quality has not improved (no in S8), the process returns to step S2. If transmission quality has improved, the scrambling frequency is calculated with the equation in step S6 in which n is set to n+1 (that is, the value of the scrambling frequency moves in the same opposite direction by $\Delta f$).

Next, a method to determine the initial value of a scrambling frequency will be described. The initial value of a scrambling frequency is set based on the polarization dependence gain characteristics (the response characteristics of polarization hole burning) as well as the polarization trackability and receiving bandwidth of the receiving section 20r.

Figure 8:
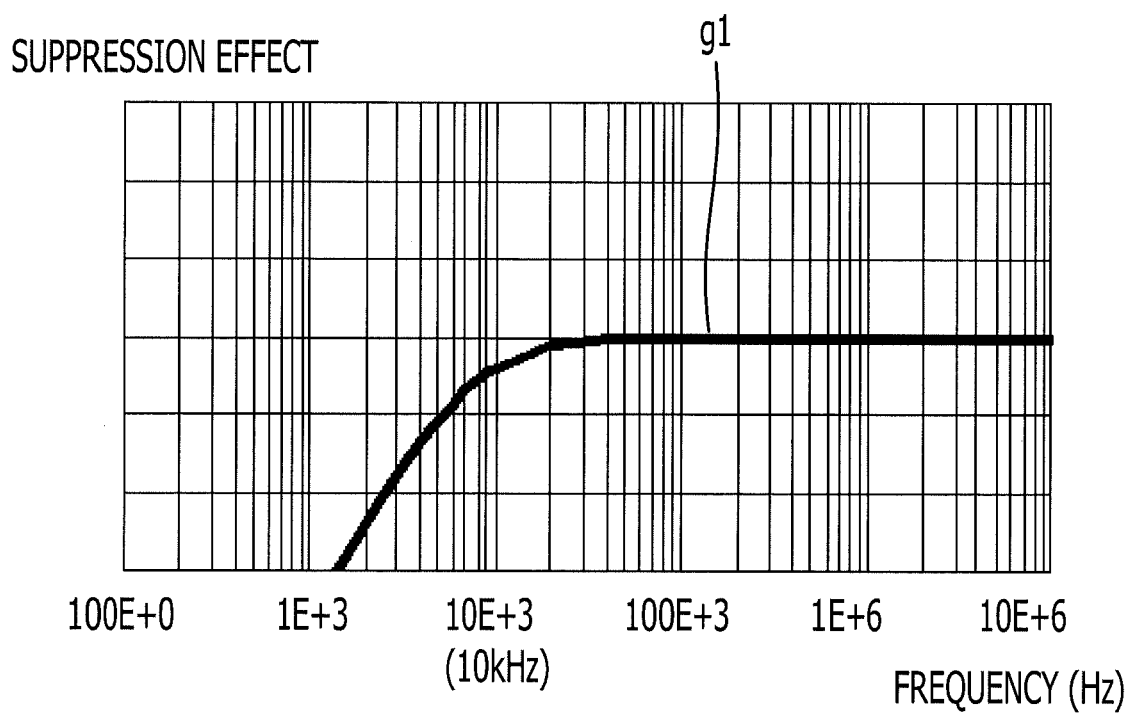
FIG. 8 is a diagram illustrating the frequency characteristics of polarization dependence gain.

FIG. 8 is a diagram illustrating the frequency characteristics of the polarization dependence gain. A graph g1 indicates the frequency characteristics of polarization dependence gain, with the horizontal axis representing frequency (Hz), and the vertical axis representing a suppression effect (that is, gain) (in FIG. 8, mE+n represents m multiplied by the n-th power of 10).

In general, polarization hole burning, which causes the polarization dependence gain of an optical amplifier, has a response frequency of approximately 10 kHz with respect to polarization fluctuation. Accordingly, by setting a scrambling frequency to a value higher than 10 kHz, a certain gain may be obtained and the degradation in the OSNR caused by the polarization dependence gain may be suppressed. In addition, an increase in fluctuation caused by polarization dependence loss may also be suppressed. As a result, as illustrated in FIG. 8, the frequency characteristics representing the effect of suppressing polarization dependence gain has the shape of a high-pass filter.

Figure 9:
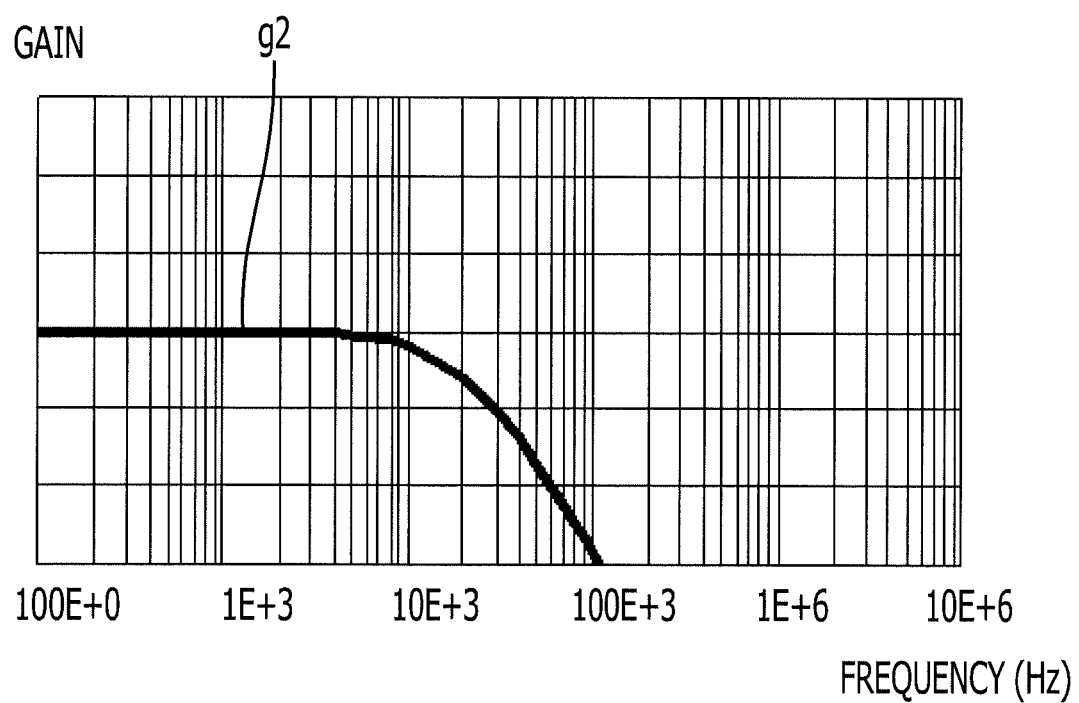
FIG. 9 is a diagram illustrating the frequency characteristics of polarization trackability.

FIG. 9 is a diagram illustrating the frequency characteristics of the polarization trackability. A graph g2 indicates the frequency characteristics of the polarization trackability of the digital signal processing unit 24, with the horizontal axis representing frequency (Hz), and the vertical axis representing gain.

The maximum polarization trackability of the digital signal processing unit 24 for digital coherent reception is several tens of kHz. Accordingly, in order to respond to polarization fluctuation on a receiving side which is caused by scrambling performed on the transmitting side, the scrambling frequency is set to a value lower than several tens of kHz on the transmitting side (by performing polarization scrambling at a frequency lower than several tens of kHz, a certain gain may be obtained and the digital signal processing unit 24 may perform normal demodulation processing). As a result, as illustrated in FIG. 9, the frequency characteristics of polarization trackability has the shape of a low-pass filter.

Figure 10:
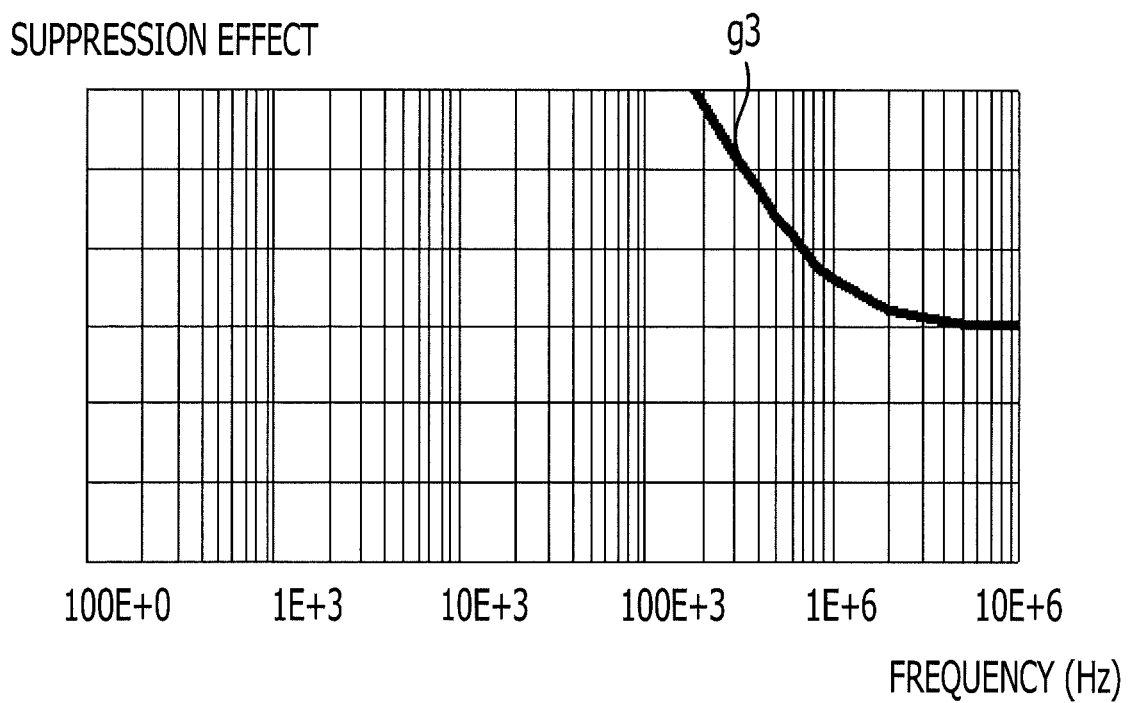
FIG. 10 is a diagram illustrating an effect of suppressing a harmonic frequency component.

FIG. 10 is a diagram illustrating an effect of suppressing a harmonic frequency component. A graph g3 indicates an effect of suppressing a harmonic frequency component, with the horizontal axis representing frequency (Hz), and the vertical axis representing a suppression effect (that is, gain).

The receiving bandwidth for digital coherent reception is similar to that of a bandpass filter. In order to cause a harmonic component (that is, an intensity-modulated component) resulting from the polarization dependence loss of an optical fiber transmission line to be outside the receiving bandwidth, it is desired that the harmonic frequencies be low. Accordingly, as illustrated in FIG. 10, a frequency characteristic representing the effect of suppressing a harmonic component in the receiving bandwidth has a shape similar to flipping the shape of the lower-frequency side of a band pass filter.

Figure 11:
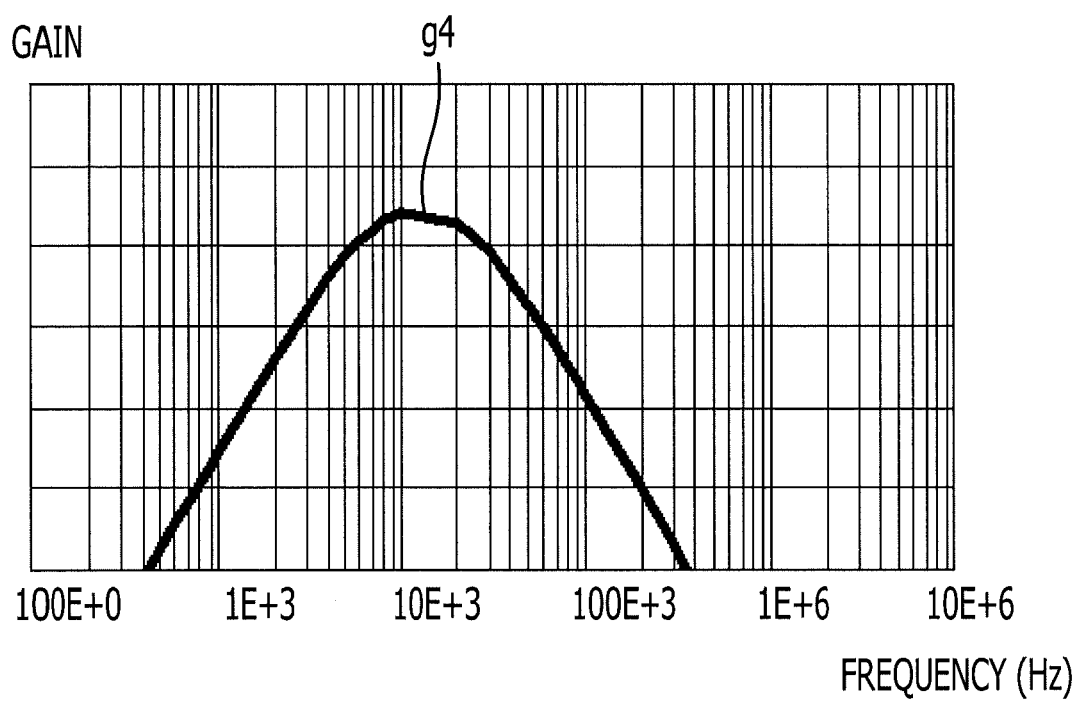
FIG. 11 is a diagram illustrating the frequency characteristics of a scrambling frequency.

The initial value of a scrambling frequency may be determined by combining the frequency characteristics illustrated in FIGS. 8 to 10. FIG. 11 is a diagram illustrating the frequency characteristic of a scrambling frequency. A graph g4 indicates the frequency characteristic of a scrambling frequency, which is obtained by combining the frequency characteristics illustrated in FIGS. 8 to 10, with the horizontal axis representing frequency (Hz), and the vertical axis representing gain.

As illustrated in FIG. 11, the highest gain is obtained at around 10 kHz. The initial value of a scrambling frequency may therefore be set to 10 kHz. In addition, and based on the frequency characteristics illustrated in FIG. 11, it is possible to estimate a frequency variation range in which a certain gain may be obtained.

Next, an operation to calculate the approximately optimum value of a scrambling frequency will be described. After the initial value of a scrambling frequency has been set, the approximately optimum value of the scrambling frequency is calculated, when operating of the system, based on transmission quality monitored on the receiving side.

Figure 12:
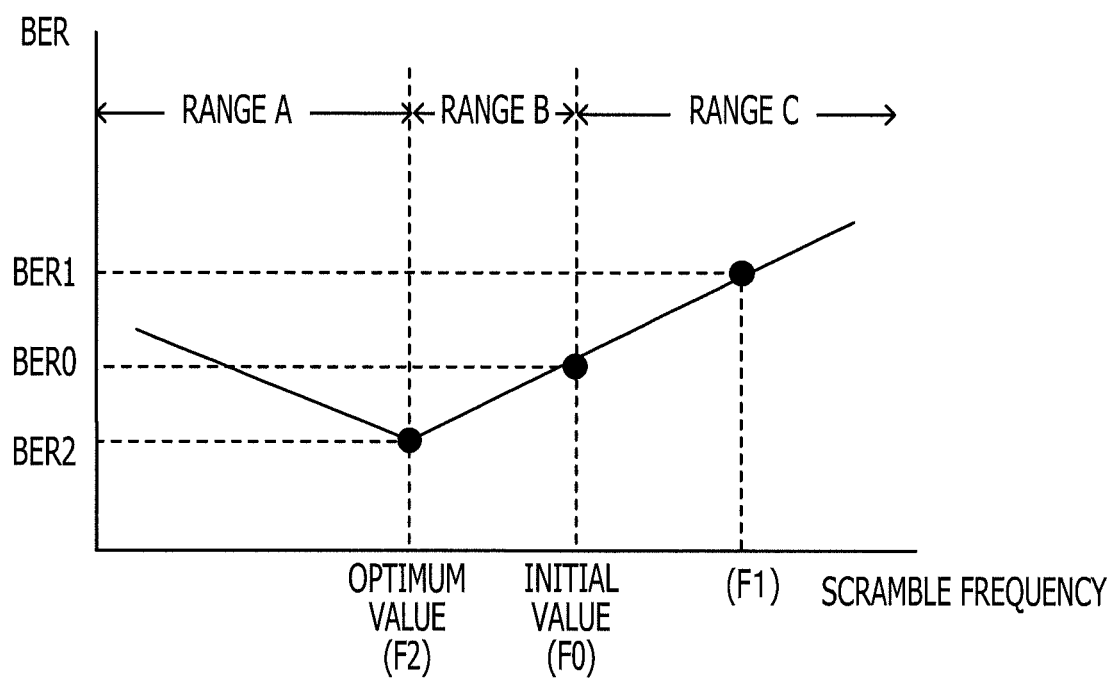
FIG. 12 is a diagram describing the operations of calculating the approximately optimum value of a scrambling frequency.

FIG. 12 is a diagram illustrating the operations to calculate the approximately optimum value of a scrambling frequency. A horizontal axis represents the scrambling frequency, and a vertical axis represents a monitoring value (for example, BER). At the initial value for a scrambling frequency (f0=10 kHz), the monitoring value for transmission quality (BER in this case) obtained on the receiving side is defined as BER0. The polarization controller 14 increases the value of a scrambling frequency from the initial value (f0) in accordance with the flowchart illustrated in FIG. 7.

The monitoring value at a scrambling frequency f1 is defined as BER1. Since BER1>BER0, transmission quality at the scrambling frequency f0 is higher than transmission quality at the scrambling frequency f1. Accordingly, subsequent to this operation, the value of the scrambling frequency is reduced from the initial value (f0) in an opposite direction in accordance with the flowchart illustrated in FIG. 7.

The monitoring value at a scrambling frequency f2 after the frequency control is defined as BER2 (<BER0). Since transmission quality is higher, the scrambling frequency is further reduced. In this example, however, a further reduction in the scrambling frequency increases the BER, that is, deteriorates the transmission quality. Accordingly, f2 may be determined as the optimum value of the scrambling frequency.

If the frequency is in a frequency range C above the scrambling frequency f0, in comparison to the BER and transmission quality at f0, the BER increases and transmission quality deteriorates. The reason for this may be because the polarization trackability of the receiver is insufficient or the receiving bandwidth of the receiver is low.

If the frequency is in a frequency range B between the scrambling frequency f2 and the scrambling frequency f0, in comparison to the BER and transmission quality at f0, the BER decreases and transmission quality improves. The reason for this may be because the polarization hole burning frequency of an optical fiber transmission line is lower than the receiving bandwidth or an insufficiency of the polarization trackability of the receiver has been overcome.

If the frequency is in a frequency range A below the scrambling frequency f0, in comparison to the BER and transmission quality at f2, the BER increases and transmission quality deteriorates. The reason for may be because the receiving band is lower than the polarization hole burning frequency of the optical fiber transmission line.

An example in which the approximately optimum value of a scrambling frequency is lower than the initial value of the scrambling frequency has been described. If the approximately optimum value of a scrambling frequency is higher than the initial value of the scrambling frequency, it may be considered that the polarization trackability of the receiver (the optical transmission apparatus 20) is good and the receiving bandwidth of the receiver is high.

Thus, a scrambling frequency may be variably set not only in the frequency range of the polarization trackability of a receiving side but also in at least one of a frequency range in which polarization dependence is suppressed and a frequency range in which a harmonic component caused by polarization dependence is outside the receiving bandwidth. As a result, it may be possible to set an approximately optimum scrambling frequency for an optical receiving apparatus that has a limited polarization trackability.

Next, modifications will be described. In the above-described embodiment, transmission quality is monitored using a BER or a Q factor. In a first modification, the number of error corrections is monitored and sent to the transmitting side via a paired line. In the following description, the same reference numerals are used to identify parts already described and the description thereof is therefore omitted.

Figure 13:
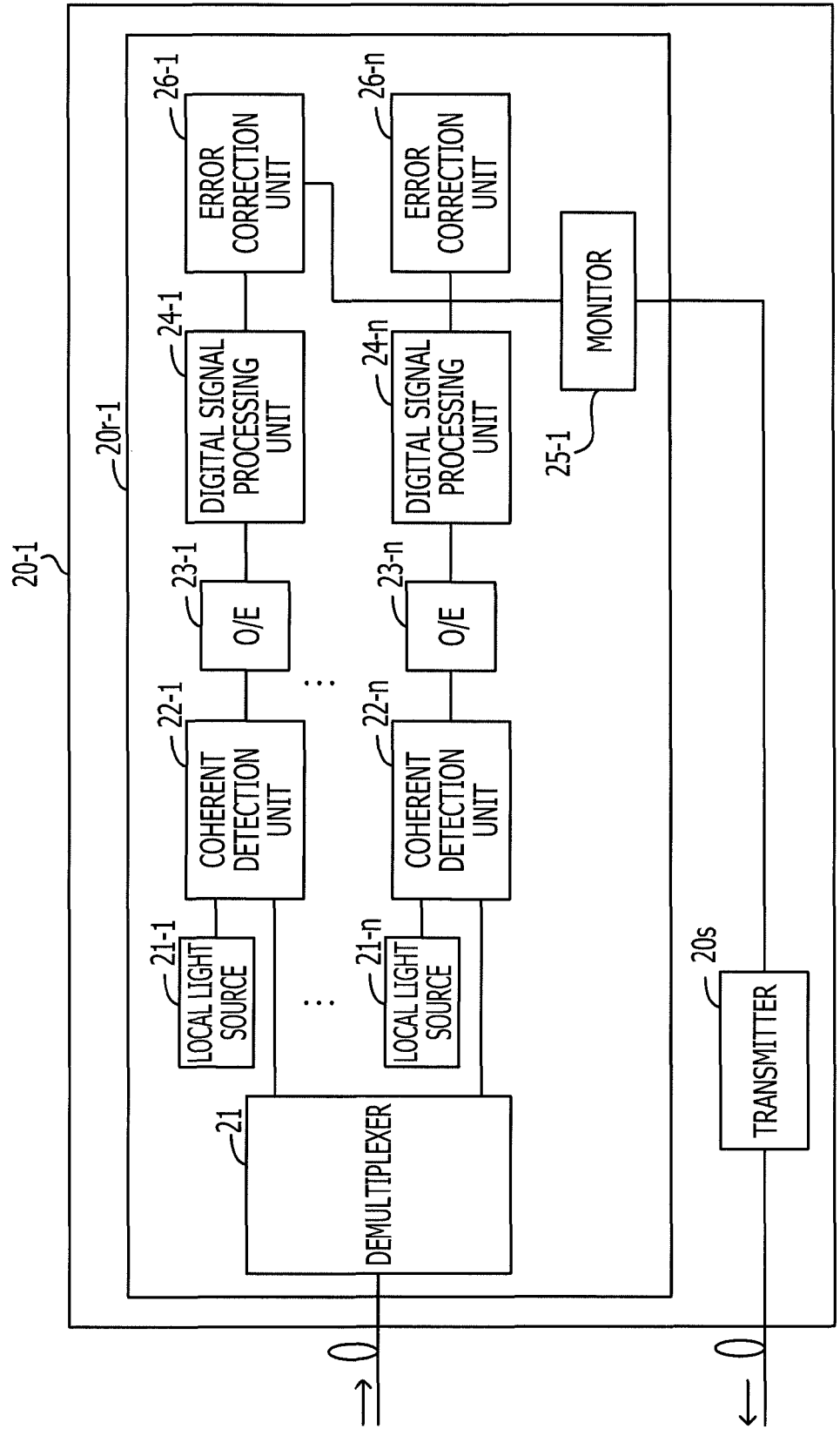
FIG. 13 is a diagram illustrating an example configuration of an optical transmission apparatus.

FIG. 13 is a diagram illustrating an example configuration of an optical transmission apparatus. An optical transmission apparatus 20-1, which is the first modification, includes a receiving section 20r-1 and the transmitter 20s. The receiving section 20r-1 includes the demultiplexer 21, the local light sources 21-1 to 21-n, the coherent detection units 22-1 to 22-n, the O/E converters 23-1 to 23-n, the digital signal processing units 24-1 to 24-n, a monitor 25-1, and error correction units 26-1 to 26-n.

The error correction units 26-1 to 26-n perform error correction on data demodulated by the digital signal processing units 24-1 to 24-n, respectively, and store the number of error corrections. The monitor 25-1 monitors the number of error corrections performed by the error correction unit 26-1. The number of error corrections is sent to the optical transmission apparatus 10 on the transmitting side by the transmitter 20s as monitoring information.

Next, a second modification will be described. In the second modification, transmission is monitored using the OSNR, which is notified to a transmitting side via a paired line.

Figure 14:
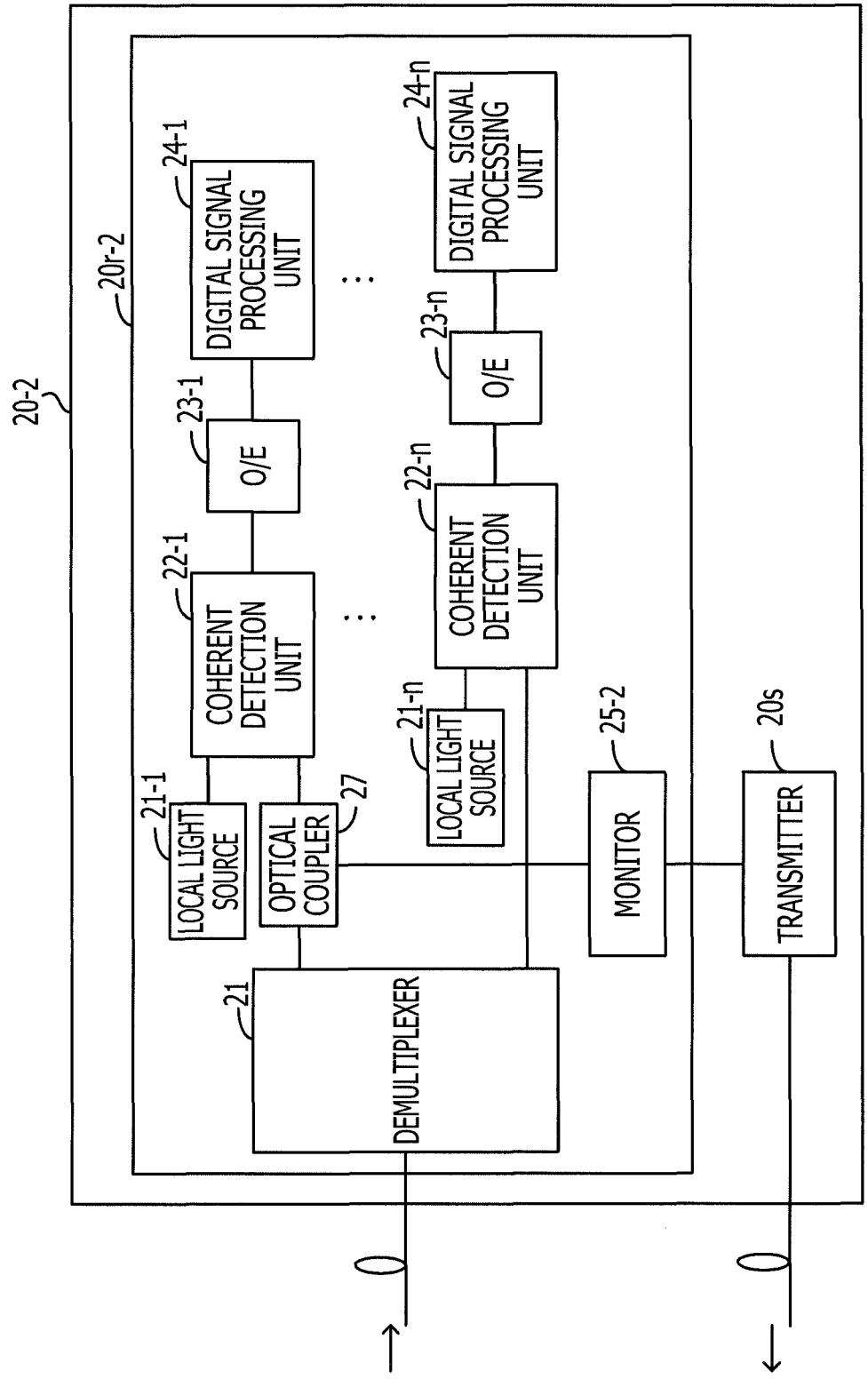
FIG. 14 is a diagram illustrating an example configuration of an optical transmission apparatus.

FIG. 14 is a diagram illustrating an example configuration of an optical transmission apparatus. An optical transmission apparatus 20-2, which is the second modification, includes a receiving section 20r-2 and the transmitter 20s. The receiving section 20r-2 includes the demultiplexer 21, the local light sources 21-1 to 21-n, the coherent detection units 22-1 to 22-n, the O/E converters 23-1 to 23-n, the digital signal processing units 24-1 to 24-n, a monitor 25-2, and an optical coupler 27.

The optical coupler 27 divides signal light having a wavelength λ1 demultiplexed by the demultiplexer 21 into two signal lights. One signal light is transmitted to the coherent detection unit 22-1, and the other signal light is transmitted to the monitor 25-2. The monitor 25-2 monitors the OSNR of the signal light output from the optical coupler 27 and input to the monitor 25-2. The OSNR is sent to the optical transmission apparatus 10 on the transmitting side by the transmitter 20s as monitoring information.

Next, a third modification will be described. In the above-described examples, a scrambling frequency is optimized so that a good monitoring result of transmission quality of a single specific signal light may be obtained. However, in a WDM transmission system, since the polarization state of signal light before polarization scrambling is not uniform, the polarization state of the signal light after polarization scrambling does not become uniform although scrambling is performed periodically.

The polarization dependence loss of an optical repeater and polarization mode dispersion in an optical fiber transmission line are wavelength-dependent. Accordingly, in a system in which the wavelength dependence of the polarization dependence loss of an optical repeater and polarization mode dispersion in an optical fiber transmission line is high, transmission quality may also be wavelength-dependent.

In the third modification, in order to suppress the wavelength dependence of transmission quality, the transmission qualities of all signal lights having different wavelengths are monitored and averaged and a result of the averaging is sent to the transmitting side via a paired line.

Figure 15:
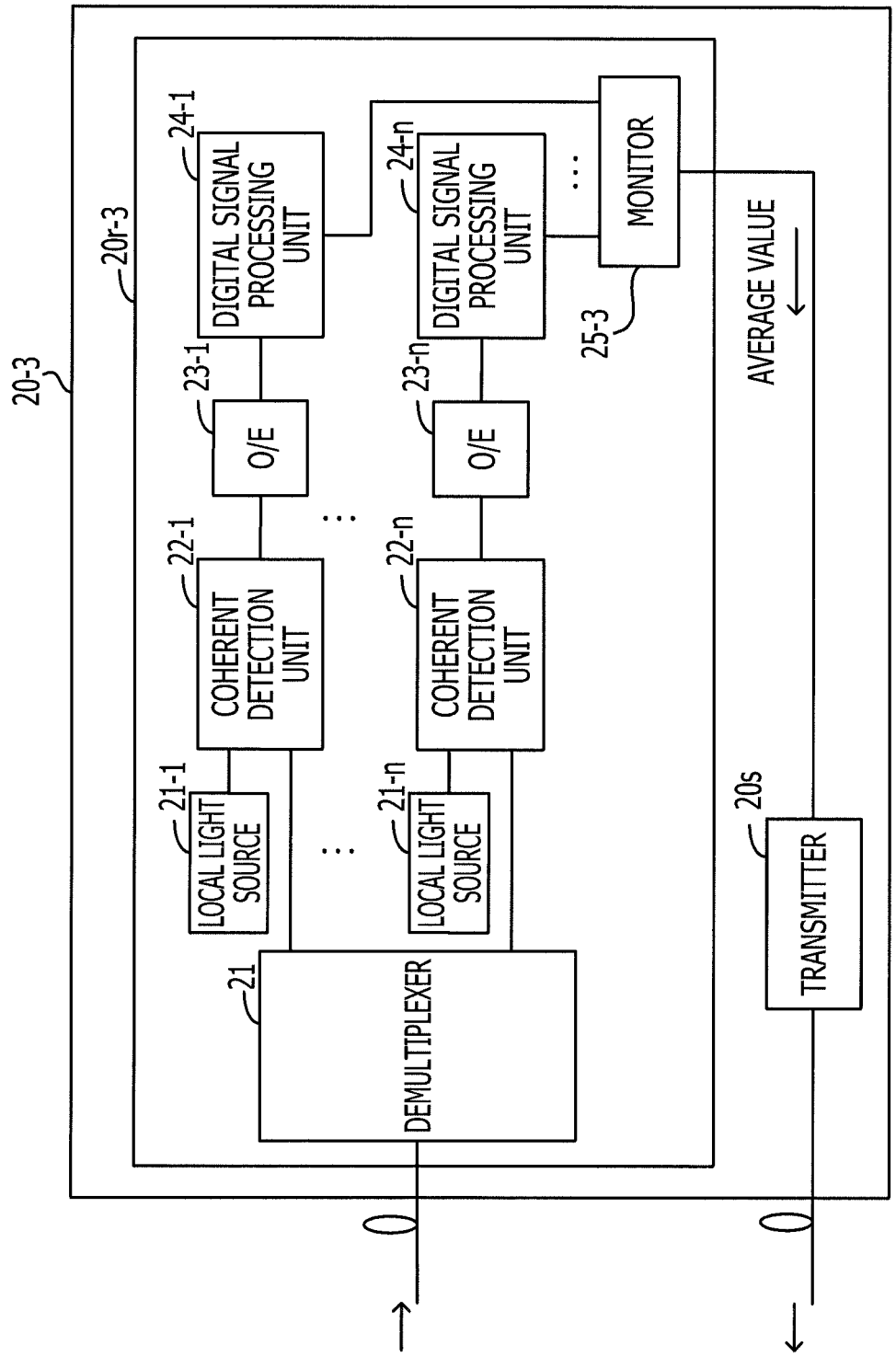
FIG. 15 is a diagram illustrating an example configuration of an optical transmission apparatus.

FIG. 15 is a diagram illustrating an example configuration of an optical transmission apparatus. An optical transmission apparatus 20-3, which is the third modification, includes a receiving section 20r-3 and the transmitter 20s. The receiving section 20r-3 includes the demultiplexer 21, the local light sources 21-1 to 21-n, the coherent detection units 22-1 to 22-n, the O/E converters 23-1 to 23-n, the digital signal processing units 24-1 to 24-n, and a monitor 25-3.

The monitor 25-3 monitors the transmission quality of all signals identified by the digital signal processing units 24-1 to 24-n. As the transmission quality, for example, a BER or Q factor may be used. The n monitored transmission quality values are averaged. The averaged value is sent to the optical transmission apparatus 10 on the transmitting side by the transmitter 20s as monitoring information.

Thus, if transmission quality has wavelength dependence, the transmission qualities of all signal lights having different wavelengths are monitored and averaged on the receiving side, and polarization control is performed on WDM signal light based on the average value. As a result, it is possible to perform polarization control that is adjusted for wavelength dependence, which may lead to an enhancement of transmission quality.

Next, a fourth modification will be described. In the fourth modification, if the wavelength dependence of transmission quality is high, the receiving side sends a notice about a plurality of monitoring results of transmission qualities of all signal lights having different wavelengths to the transmitting side. On the transmitting side, polarization controllers for respective signal lights are disposed and polarization control is performed for each separate wavelength.

Figure 16:
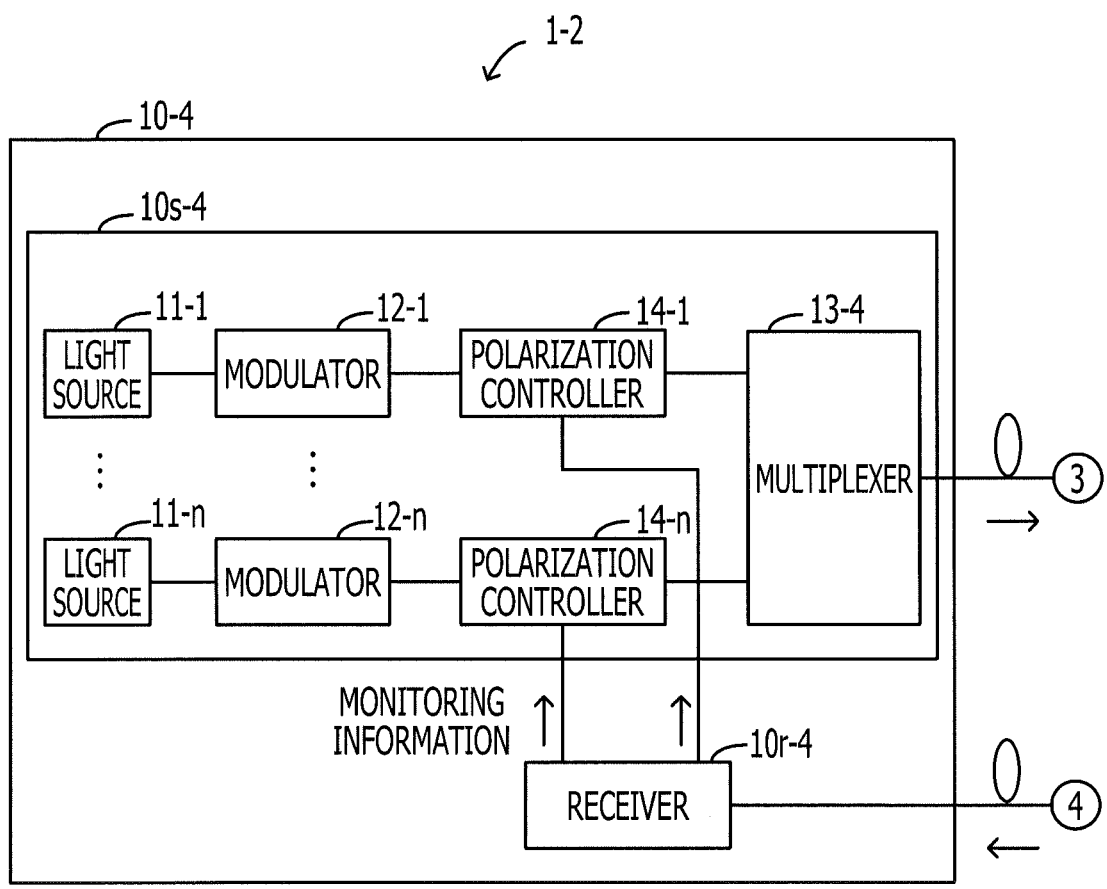
FIG. 16 is a diagram illustrating an example configuration of an optical transmission system.
Figure 17:
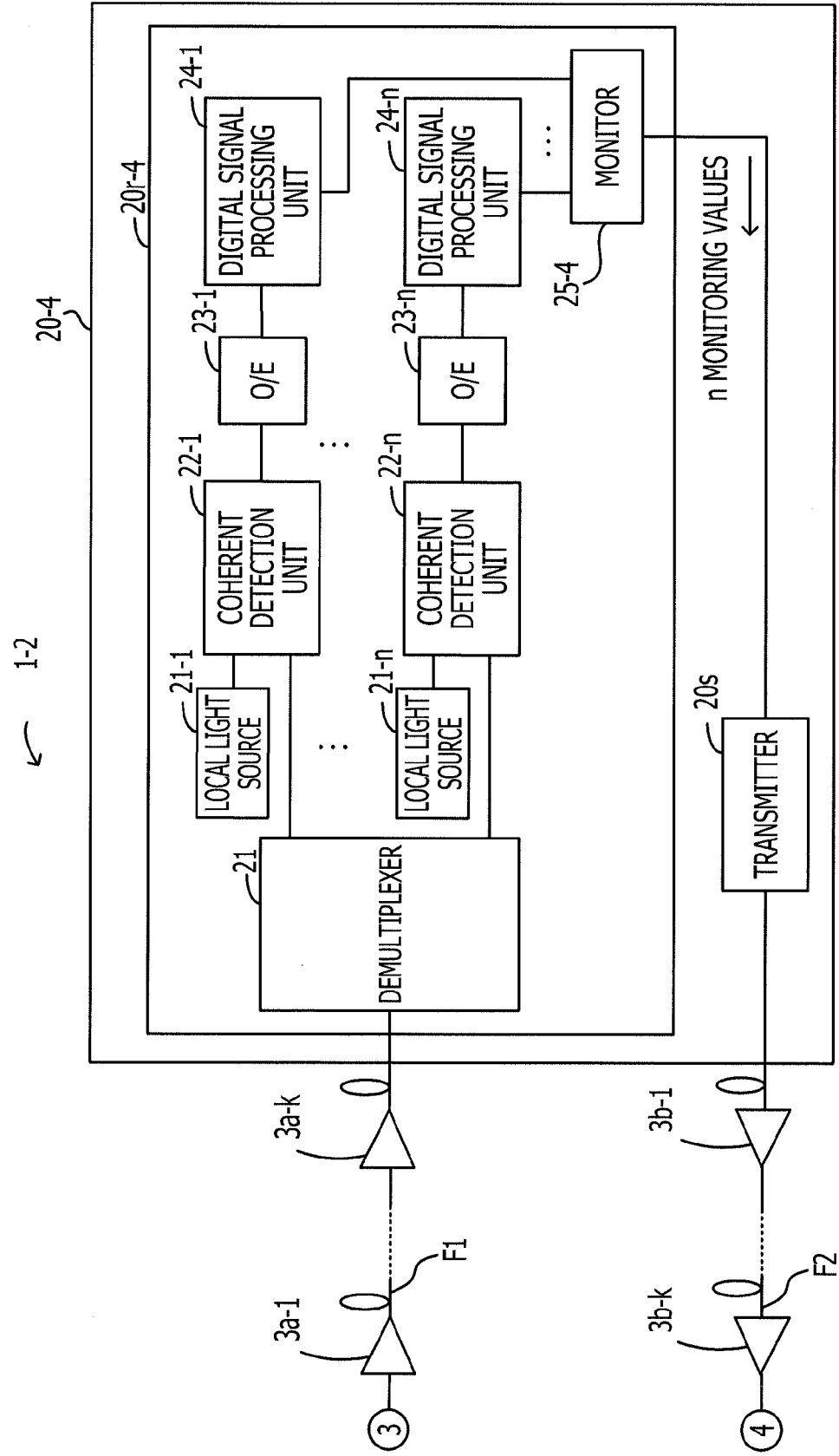
FIG. 17 is a diagram illustrating an example configuration of an optical transmission system.

FIGS. 16 and 17 are diagrams illustrating an example configuration of an optical transmission system. An optical transmission system 1-2 that is the fourth modification includes optical transmission apparatuses 10-4 and 20-4, and performs bi-directional WDM transmission.

The optical transmission apparatuses 10-4 and 20-4 are connected to each other via the optical fiber transmission lines F1 and F2. On the optical fiber transmission line F1, the optical repeaters 3a-1 to 3a-k are disposed. On the optical fiber transmission line F2, the optical repeaters 3b-1 to 3b-k are disposed.

The optical transmission apparatus 10-4 includes a transmitter 10s-4 and a receiving section 10r-4. The transmitter 10s-4 includes the light sources 11-1 to 11-n, the modulation units 12-1 to 12-n, a multiplexer 13-4, and polarization controllers 14-1 to 14-n.

Each of the polarization controllers 14-1 to 14-n variably sets a scrambling frequency based on corresponding monitoring information given thereto so that a monitoring result on the receiving side becomes an approximately optimum value. The polarization states of signal lights having the wavelengths Uλ1 to λn are individually changed at the set scrambling frequencies and are output. The multiplexer 13-4 multiplexes the signal lights having the wavelengths λ1 to λn which have been subjected to polarization control so as to generate WDM signal light.

The optical transmission apparatus 20-4 includes a receiving section 20r-4 and the transmitter 20s. The receiving section 20r-4 includes the demultiplexer 21, the local light sources 21-1 to 21-n, the coherent detection units 22-1 to 22-n, the O/E converters 23-1 to 23-n, the digital signal processing units 24-1 to 24-n, and a monitor 25-4.

The monitor 25-4 monitors the transmission qualities of all signals identified by the digital signal processing units 24-1 to 24-n. As the transmission quality, for example, a BER or a Q factor may be used. Subsequently, n monitoring values are sent to the optical transmission apparatus 10-4 on the transmitting side by the transmitter 20s as monitoring information.

Thus, if transmission quality has wavelength dependence, the transmission quality of all signal lights for all of the wavelengths are monitored on the receiving side, monitoring values corresponding to all of the wavelengths are sent to the transmitting side, and polarization control is performed, based on the notified monitoring values, for each wavelength. As a result, it may be possible to perform polarization control that is adjusted for wavelength dependence. This may lead to an enhancement of transmission quality.

Although an example embodiment has been described, each component discussed in the embodiment may be replaced with another component having a similar function. An optional component and/or an optional process may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission system comprising:
   an optical transmitting apparatus that includes a polarization controller configured to change a polarization state of a single light at an operating frequency included in a frequency range at which polarization trackability is obtained on a receiving side, based on a notified monitoring result, the optical transmitting apparatus being configured to output the signal light having the changed polarization state, the polarization controller configured to check an improvement of transmission quality, change, in a first direction, a frequency for changing the polarization state of a signal light to be transmitted to the optical transmitting apparatus when acquiring the improvement, and change, in a second direction opposite to the first direction, the frequency for changing the polarization state of the signal light to be transmitted to the optical transmitting apparatus when not acquiring the improvement; and an optical receiving apparatus, coupled to the optical transmitting apparatus via an optical fiber transmission line, that is provided on the receiving side and includes a monitoring control unit configured to:

receive the signal light having the changed polarization state, and monitor the transmission quality of the received signal light.

2. The optical transmission system of claim 1, wherein the polarization controller variably sets the operating frequency included in at least one of a frequency range in which polarization dependence is suppressed and a frequency range in which a harmonic component caused by the polarization dependence is outside a receiving bandwidth on the receiving side in addition to in the frequency range at which the polarization trackability is obtained.

3. The optical transmission system of claim 1, wherein the optical transmitting apparatus generates wavelength division multiplexed signal light as the signal light and transmits the generated wavelength division multiplexed signal light, and wherein, when the transmission quality does not have wavelength dependence caused by wavelength division multiplexing transmission between the optical transmitting apparatus and the optical receiving apparatus, the monitoring control unit monitors the transmission quality corresponding to one of wavelengths of the signal light and notifies the optical transmitting apparatus of the monitoring result, and the polarization controller changes a polarization state of the wavelength division multiplexing signal light based on the monitoring result.

4. The optical transmission system of claim 1, wherein the optical transmitting apparatus generates wavelength division multiplexing signal light as the signal light and transmits the generated wavelength division multiplexing signal light, and wherein, when the transmission quality has wavelength dependence caused by wavelength division multiplexing transmission between the optical transmitting apparatus and the optical receiving apparatus, the monitoring control unit monitors transmission quality values corresponding to respective wavelengths of the signal light, calculates an average transmission quality value of the monitored transmission quality values, and notifies the optical transmitting apparatus of the average transmission quality value as the monitoring result, and the polarization controller changes a polarization state of the wavelength division multiplexing signal light based on the monitoring result.

5. The optical transmission system of claim 1, wherein the optical transmitting apparatus generates wavelength division multiplexing signal light as the signal light and transmits the generated wavelength division multiplexing signal light, and wherein, when the transmission quality has wavelength dependence caused by wavelength division multiplexing transmission between the optical transmitting apparatus and the optical receiving apparatus, the monitoring control unit monitors transmission quality values corresponding to respective wavelengths of the signal light and notifies the optical transmitting apparatus of a plurality of the monitoring results corresponding to the respective wavelengths, and the polarization controller changes polarization states of signal lights to be subjected to wavelength division multiplexing based on the plurality of the monitoring results, the signal lights to be subjected to wavelength division multiplexing having the respective wavelengths.

6. An optical transmitting apparatus comprising:

a receiver configured to receive a monitoring result of transmission quality of a signal light; and a polarization controller configured to change a polarization state of the signal light at an operating frequency included in a frequency range at which polarization trackability is obtained on a receiving side, based on the monitoring result and to output the signal light having the changed polarization state to an optical receiving apparatus coupled to the optical transmitting apparatus via an optical fiber transmission line, wherein the polarization controller checks an improvement of the transmission quality, changes, in a first direction, a frequency for changing a polarization state of a signal light to be transmitted to the optical transmitting apparatus when acquiring the improvement, and changes, in a second direction opposite to the first direction, the frequency for changing the polarization state of the signal light to be transmitted to the optical transmitting apparatus when not acquiring the improvement.

7. The optical transmitting apparatus of claim 6, wherein the polarization controller variably sets the operating frequency included in at least one of a frequency range in which polarization dependence is suppressed and a frequency range in which a harmonic component caused by the polarization dependence is outside a receiving bandwidth on the receiving side in addition to in the frequency range at which the polarization trackability is obtained.

8. The optical transmitting apparatus of claim 6, wherein the optical transmitting apparatus generates wavelength division multiplexing signal light as the signal light and transmits the generated wavelength division multiplexing signal light, and wherein, when the transmission quality does not have wavelength dependence caused by wavelength division multiplexing transmission between the optical transmitting apparatus and the receiving side, the polarization controller changes a polarization state of the wavelength division multiplexing signal light based on a monitoring result of a transmission quality corresponding to one of wavelengths of the signal light.

9. The optical transmitting apparatus of claim 6, wherein the optical transmitting apparatus generates wavelength division multiplexing signal light as the signal light and transmits the generated wavelength division multiplexing signal light, and wherein, when the transmission quality has wavelength dependence caused by wavelength division multiplexing transmission between the optical transmitting apparatus and the receiving side, the polarization controller changes a polarization state of the wavelength division multiplexing signal light based on a monitoring result that is an average value of monitored transmission quality values corresponding to respective wavelengths of the signal light.

10. The optical transmitting apparatus of claim 6,
wherein the optical transmitting apparatus generates wavelength division multiplexing signal light as the signal light and transmits the generated wavelength division multiplexing signal light, and
wherein, when the transmission quality has wavelength dependence caused by wavelength division multiplexing transmission between the optical transmitting apparatus and the receiving side, the polarization controller changes, based on a plurality of monitoring results of transmission quality values corresponding to respective wavelengths of the signal light, polarization states of signal lights to be subjected to wavelength division multiplexing, the signal lights to be subjected to wavelength division multiplexing having the respective wavelengths.

11. An optical receiving apparatus comprising:
a monitor configured to:
    monitor transmission quality of a signal light whose polarization state is controlled, at an operating frequency included in a frequency range at which polarization trackability is obtained in the optical receiving apparatus, in an optical transmitting apparatus coupled to the optical receiving apparatus via an optical fiber transmission line by
    checking an improvement of the transmission quality,
    changing, in a first direction, a frequency for changing a polarization state of a signal light to be transmitted to the optical transmitting apparatus when acquiring the improvement, and
    changing, in a second direction opposite to the first direction, the frequency for changing the polarization state of the signal light to be transmitted to the optical transmitting apparatus when not acquiring the improvement; and
a notification circuit configured to transmit a notification for the monitoring result to the optical transmitting apparatus.

12. The optical receiving apparatus of claim 11,
wherein the monitor monitors a transmission quality of the signal light whose polarization state is controlled at the operating frequency included in at least one of a frequency range in which polarization dependence is suppressed and a frequency range in which a harmonic component caused by the polarization dependence is outside a receiving bandwidth in the optical receiving apparatus in addition to in the frequency range at which the polarization trackability is obtained.

13. The optical receiving apparatus of claim 11,
wherein wavelength division multiplexing signal light is transmitted as the signal light from a transmitting side and received by the optical receiving apparatus, and
wherein, when the transmission quality does not have wavelength dependence caused by wavelength division multiplexing transmission between the transmitting side and the optical receiving apparatus, the monitor monitors the transmission quality corresponding to one of wavelengths of the signal light and the notification circuit notifies the transmitting side of the monitoring result.

14. The optical receiving apparatus of claim 11,
wherein wavelength division multiplexing signal light is transmitted as the signal light from a transmitting side and received by the optical receiving apparatus, and
wherein, when the transmission quality has wavelength dependence caused by wavelength division multiplexing transmission between the transmitting side and the optical receiving apparatus, the monitor monitors transmission quality values corresponding to respective wavelengths of the signal light and calculates an average transmission quality value of the transmission quality values and the notification unit notifies the transmitting side of the average transmission quality value as the monitoring result.

15. The optical receiving apparatus of claim 11,
wherein wavelength division multiplexing signal light is transmitted as the signal light from a transmitting side and received by the optical receiving apparatus, and
wherein, when the transmission quality has wavelength dependence caused by wavelength division multiplexing transmission between the transmitting side and the optical receiving apparatus, the monitor monitors transmission quality values corresponding to respective wavelengths of the signal light and the notification unit notifies the transmitting side of a plurality of the monitoring results corresponding to the respective wavelengths.

16. The optical transmission system of claim 1, wherein the transmission quality is at least one of a bit error rate or a Q factor.

17. The optical transmitting apparatus of claim 6, wherein the transmission quality is at least one of a bit error rate or a Q factor.

18. The optical receiving apparatus of claim 11, wherein the transmission quality is at least one of a bit error rate or a Q factor.

* * * * *